Dec. 25, 1923. Re. 15,735

J. T. DRUFVA

PORTABLE ELECTRIC LIGHT

Original Filed Dec. 22, 1917 2 Sheets-Sheet 1

Inventor:
JOHN T. DRUFVA,
By
John H. Bruninga,
His Attorney.

Dec. 25, 1923. Re. 15,735

J. T. DRUFVA

PORTABLE ELECTRIC LIGHT

Original Filed Dec. 22, 1917 2 Sheets-Sheet 2

Inventor:
JOHN T. DRUFVA,
By John H. Bruninga
His Attorney

Reissued Dec. 25, 1923. Re. 15,735

UNITED STATES PATENT OFFICE.

JOHN T. DRUFVA, OF LONGMEADOW, MASSACHUSETTS, ASSIGNOR TO HENRY HYMAN & CO., INC., OF NEW YORK, N. Y., A CORPORATION OF NEW YORK.

PORTABLE ELECTRIC LIGHT.

Original No. 1,320,846, dated November 4, 1919, Serial No. 208,346, filed December 22, 1917. Application for reissue filed November 8, 1920. Serial No. 422,737.

*To all whom it may concern:*

Be it known that I, JOHN T. DRUFVA, a citizen of the United States, and a resident of Longmeadow, in the county of Hampton and State of Massachusetts, have invented certain new and useful Improvements in Portable Electric Lights, of which the following is a specification.

This invention relates to battery hand lamps or flashlights of the type adapted to be lighted while held in the hand by the manipulation of a thumb switch or similar device.

The construction of such hand lamps often includes a case of insulating material having metal fittings at both ends which are included in the electric circuit in such a way that it is possible, by establishing a conducting connection between said fittings, to light the lamp. This results in the liability, when such a lamp is carried in a tool box or similar places, of establishing a circuit between such fittings by accidentally contacting with tools, etc. thereby lighting the lamp and exhausting the battery unnecessarily.

One of the objects of this invention therefore, is to provide novel means for insulating the electric circuit, so as to avoid the possibility of accidentally lighting the lamp.

In lamps having metallic casings, which are included in the electric circuit, it is necessary to insulate one branch of the circuit between the switch and the battery.

Another object of this invention, therefore, is to provide novel means for insulating one side of the circuit from the metallic casing.

Another object of this invention is to provide means for relieving the lamp of the end thrust of the battery.

Further objects will appear from the following description taken in connection with the accompanying drawings, in which.

Figure 1:
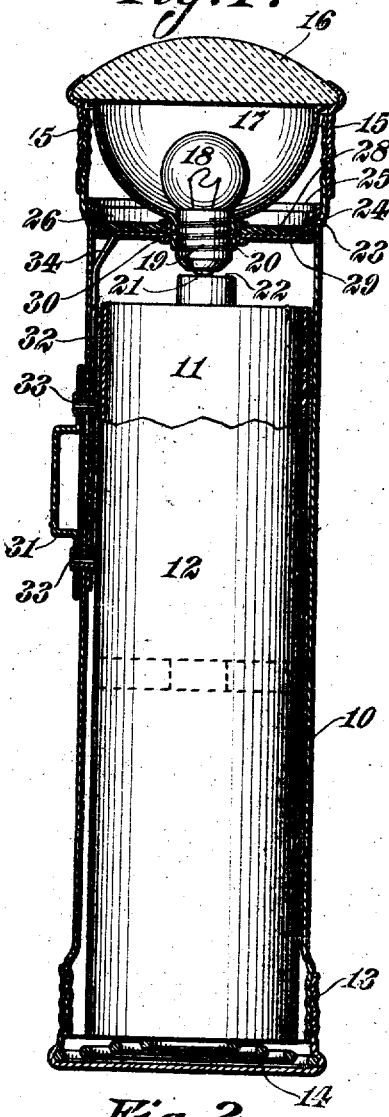
Figure 1 is a sectional view of a metallic casing lamp embodying this invention.

Referring now to the accompanying drawing, 10 designates the casing of a metallic casing lamp, 11 the battery, 12 the insulating covering for the battery, 13 the lower end cap of the casing, 14 the contacting spring for establishing contact between the casing and the lower end of the battery, 15 the upper end cap of the casing adapted to hold the lens 16. 17 designates the reflector, 18 the lamp having a contact sleeve 19 and a central contact 21 for establishing contact with the terminal 22 of the battery 11. All these are of the usual construction, well known in the art and, therefore, need no further description.

Mounted in the upper end of the casing is an insulating support for the reflector comprising an insulating disc or ring 28 mounted in a metal rim 24 having an internal flange 27 adapted to support the disc 28, and an enlarged portion 25 forming a shoulder adapted to seat upon a shoulder 23 in the casing. The disc or ring 28, of insulating material carries a bottom plate or disc 29 of conducting material, the two being held together by an eyelet 30 passing through a central aperture in both discs and forming a sleeve adapted to contact with and form a seat for the reflector 17. The disc 29 is smaller in outside diameter than the disc 28, so as to avoid contact with the flange 27 and the rim 24.

This insulating support being seated in the casing, the lower sleeve 20 of the reflector is seated within the eyelet 30. The reflector is thereby supported and centered in its proper position in the casing. The upper end of the reflector 17 may be of smaller diameter than the casing so as to avoid contact therewith.

In this lamp, the thumb switch comprises a thumb piece 31 connected by rivets 33 passing through slots in the casing to a contact strip 32 passing upwardly from the switch within the casing and being bent over as shown at 34, so as to make contact with the disc 29 when the thumb piece 31 is moved upwardly.

Figure 4:
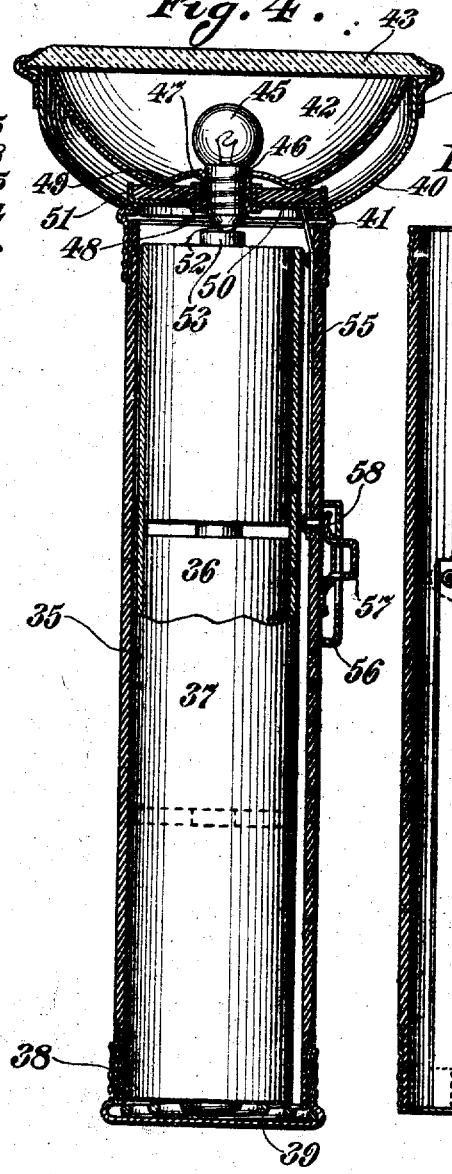
Figure 4 is a sectional view of a fibre casing lamp embodying this invention.
Figure 5:
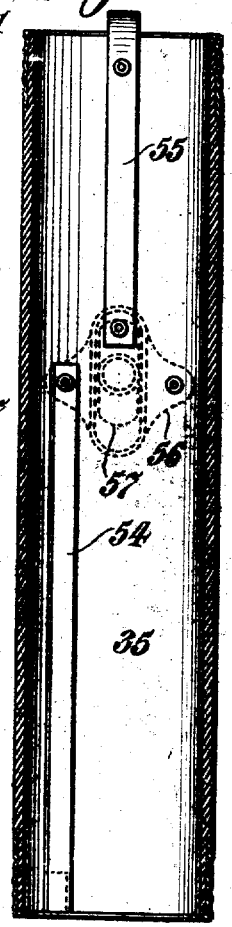
Figure 5 is a sectional view of the fibre casing showing the arrangement of conductors leading to the switch.

In the lamp shown in Figures 4 and 5, the fibre casing 35 is provided with metallic screw fittings at both ends. The lower end cap 38 and contact springs 39 are of the usual construction and arrangement.

A flared metallic end cap 40 may be adapted to screw on to the upper screw fitting on the casing. The cap 40 is bent inwardly so as to form an inner annular shoulder 41 adapted to receive the insulating support for the reflector. This is of the same construction as previously described comprising the insulating disc or ring 49 and the lower contact plate 50 connected by the eyelet 48. The disc 49 rests in the metal rim 51 which rests on the shoulder 41. The lower sleeve 47 of the reflector 42 contacts with the eyelet 48. The reflector 42 rests upon the insulating disc 49 being held thereagainst by pressure of the glass plate 43 closing the outer end of the lamp and held in place by the ring 44. The outer end of the reflector is of smaller diameter than the outer end of the cap 40 so as to avoid contact therewith.

The thumb switch comprises an escutcheon 56 enclosing a sliding contact member 58 operated by the thumb piece 57 which slides in a slot in the escutcheon 56. The contact member 58 is slidable into or out of contact with the head of a rivet connecting with the contact strip 55 extending upwardly beyond the upper end of the casing. The upper rivet attaching the strip 55 to the casing has its outer end sunk below the outside surface of the casing, so as to avoid contact with the metallic screw fitting thereon. The strip 55 contacts with the disc 50 to establish a circuit with the lamp.

Figure 2:
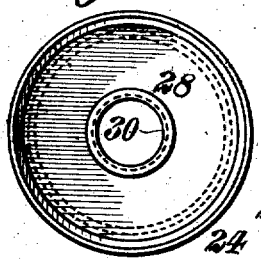
Figure 2 is a top view of the insulating device used for insulating the reflector from the casing.
Figure 3:
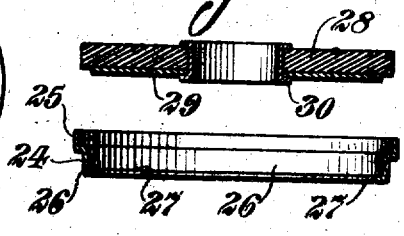
Figure 3 is a cross sectional view of the two parts of the device shown in Figure 2 on a somewhat larger scale.
Figure 6:
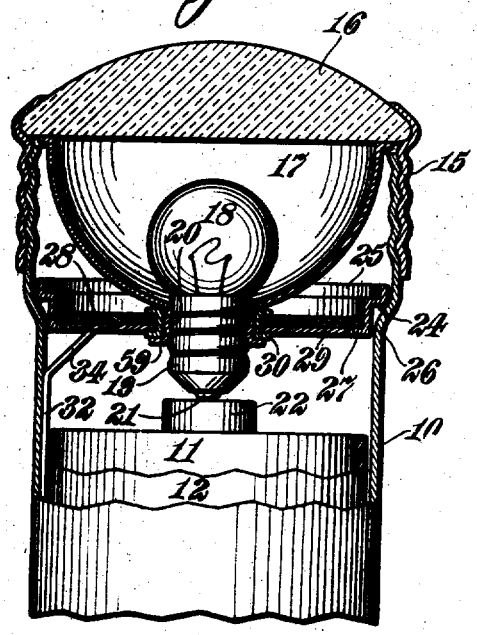
Figure 6 is an enlarged sectional view of the upper end of the lamp shown in Figure 1.
Figure 7:
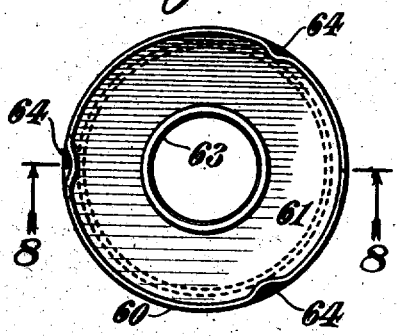
Figure 7 is a top plan view of a modified form of the insulating device similar to that shown in Figure 2.
Figure 8:
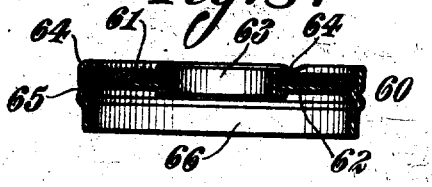
Figure 8 is a sectional view on the line 8—8 of Fig. 7.

The device shown in Figures 7 and 8 is a modification of that shown in Figures 2 and 3, in which the supporting and reinforcing ring 66 is connected to the insulating disc 61, by bending over the outstanding portion of said ring in a number of places as shown at 64. By this arrangement, the disc 61 can be detachably connected to the ring 66 by snapping it into the annular space between the lips 64 and the inner shoulder 65.

Figure 9:
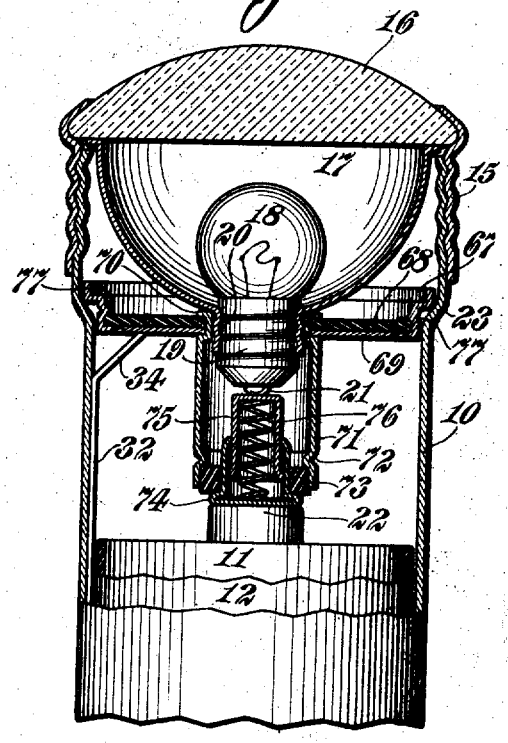
Figure 9 is a sectional view of the upper end of the lamp showing the shock absorber and adaptor features.
Figure 10:
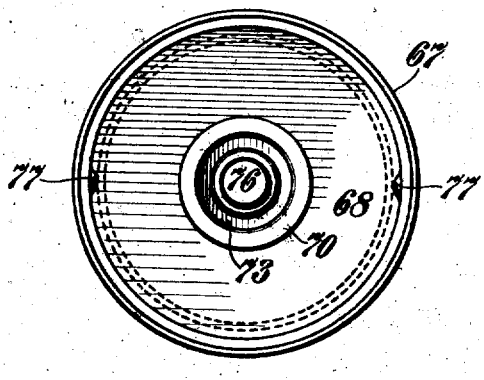
Figure 10 is a detached top view of the reflector support shown in Figure 9.

The device shown in Figures 9 and 10 is adapted to take up the end thrust of the battery so as to relieve the lamp thereof and also to compensate for a difference in the corresponding length of battery and casing.

The insulated base or support for the reflector and lamp, which fits the casing and centers the reflector and the lamp, in this case is of a construction similar to that shown in Figures 2 and 3, with the exception that the supporting and reenforcing rim 67 is indented at two or more points as shown at 77 so as to retain the disc in the ring, while the eyelet 70 connecting the disc 68 to the contact ring or plate 69 is extended downwardly in the form of a tube 71, which thus forms an extension to the metallic base supported in the casing. Near its lower end, the tube 71 has an inwardly bent beading 72 which forms a shoulder against which a washer or insulating element 73 abuts. The washer 73 carries a central contact cup 74, which engages the battery terminal 22, provides a fixed contact adapted for abutment thereby, and receives in its upper portion a vertically movable cap 75 containing a coil spring 76 bearing at one end against the contact 74 and at the other end against the upper end of the cap 75, and operating to press the cap 75 against the terminal 21 of the lamp, so as to form a yielding contact adapted for abutment by the lamp and providing an electrical connection between the lamp and the battery. Interengaging flanges on parts 74 and 75 guide and limit their relative movement. The eyelet 70 provides a socket for positioning the lamp to engage the contact 75.

It will be apparent that the upward thrust of the battery 11 will be transmitted by way of the washer 73 and the tube 71 to the reflector 17 so as to provide a buffer or bumper whereby any shock due to rough handling or dropping of the lamp will be taken up by the reflector and not by the lamp.

It will also be apparent that the rims 24, 66 and 67 individually or in cooperation with the plates 29, 62 and 69, operate to mechanically reinforce the insulating discs 28, 61 and 68, thereby making it possible to use very thin discs.

It is obvious that various changes may be made in the details of construction within the scope of the appended claims without departing from the spirit of this invention; it is, therefore, to be noted that this invention is not limited to the specific details shown and described except as limited by the claims.

Having thus described the invention, what is claimed is:

1. In a battery hand lamp having a casing provided with a metallic part, and having a metallic reflector in the lamp circuit, insulating means adapted to support said reflector on but out of contact with the metallic part, comprising, an insulating element engaging the reflector and a reinforcing rim surrounding said element and engaging the metallic part.

2. In a battery hand lamp having a casing provided with a metallic part, and having a metallic reflector in the lamp circuit, insulating means adapted to support said reflector on said metallic part and center the same in said casing, comprising, an insulating element engaging the reflector and a reinforcing rim surrounding said element and engaging the metallic part.

3. In a battery hand lamp having a casing provided with a metallic part, and having a metallic reflector in the lamp circuit, insulating means adapted to support said reflector on said metallic part, comprising, an insulating element engaging the reflector and a rim surrounding said element and engaging the metallic part.

4. In a battery hand lamp having a casing provided with a metallic part, and having a metallic reflector in the lamp circuit, insulating means adapted to support said reflector out of contact with said metallic part, comprising, an insulating ring, and a metal rim surrounding and adapted to reenforce said ring.

5. In a battery hand lamp, a casing having a metallic part, a metallic reflector having a lamp therein, insulating means adapted to support said reflector out of contact with said metallic part, means for reenforcing said insulating means, means engaging the battery terminal adapted to transmit the end thrust of the battery to said reflector, and means for yieldingly connecting said lamp with the battery terminal.

6. In a battery hand lamp, a casing having a metallic part, a metallic reflector having a lamp therein, insulating means adapted to support said reflector out of contact with said metallic part, means for reenforcing said insulating means, means adapted to relieve said lamp of the end thrust of the battery, and means for yieldingly connecting said lamp with the battery terminal.

7. In a battery hand lamp, a casing having a metallic part, a metallic reflector having a lamp therein, insulating means adapted to support said reflector out of contact with said metallic part means on said insulating means and engaging the battery terminal adapted to transmit the end thrust of the battery to said reflector, and means for yieldingly connecting the lamp with the battery.

8. In a battery hand lamp, a casing having a metallic part, a metallic reflector having a lamp therein, insulating means adapted to support said reflector out of contact with said metallic part, comprising an insulating ring and a metal rim adapted to reenforce said ring, a buffer on said insulating means adapted to take the end thrust of the battery, and means for yieldingly connecting the lamp with the battery.

9. In a battery hand lamp having a metallic casing part and a metallic reflector, an insulating support comprising, an insulating ring for engaging the reflector and a rim for said ring for engaging the casing part.

10. In a battery hand lamp having a metallic casing part and a metallic reflector, an insulating support comprising, an insulating ring in which the reflector is adapted to seat, and a reinforcing rim for said ring adapted to seat in the casing part.

11. In a battery hand lamp having a metallic casing part and a metallic reflector, an insulating support comprising, an insulating supporting ring and a metallic reinforcing rim therefor.

12. In a battery hand lamp having a metallic casing part and a metallic reflector, an insulating support comprising, an insulating supporting ring having an eyelet and a reinforcing rim.

13. In a battery hand lamp having a metallic casing part and a metallic reflector, an insulating support comprising, an insulating supporting ring having a metallic reinforcing eyelet and a metallic rim.

14. In a battery hand lamp having a metallic casing part provided with a shoulder spaced from the end of the casing and having a metallic reflector, an insulating support comprising, an insulating supporting ring in which the reflector is adapted to seat, and a reinforcing rim adapted to seat on said shoulder.

15. In a battery hand lamp having a casing part and a reflector provided with a lamp, a support in which the reflector is adapted to seat and which is adapted to seat in the casing, and a bumper on said support adapted for engagement by the battery terminal.

16. In a battery hand lamp having a casing part and a reflector provided with a lamp, a support in which the reflector is adapted to seat and which is adapted to seat in the casing, a bumper on said support adapted for engagement by the battery terminal, and a yielding lamp contact on said bumper.

17. In a battery hand lamp having a metallic casing part and a metallic reflector provided with a lamp, an insulating support in which the reflector is adapted to seat and which is adapted to seat in the casing, and a bumper on said support adapted for engagement by the battery terminal.

18. In a flashlight, the combination of a lamp, a lamp holder, a battery, and a combined contacting and thrust-resisting device between the lamp and the battery, said device comprising a tubular member and an insulating member attached thereto, and relatively movable spring-pressed parts carried by the insulating member and arranged within the tubular member.

19. In a flashlight, the combination of a lamp, a lamp holder, a battery, a tubular member extending from the holder toward the battery, an insulating member in the tubular member, a fixed contact carried by the tubular member and arranged to engage the central terminal of the battery, a movable contact carried by the said fixed contact and arranged to engage the central contact of the lamp, and spring means between the fixed and movable contacts for urging the latter toward the lamp.

20. In a flashlight, a device for electrically connecting the central terminal of a battery with the central contact of a lamp and for resisting the thrust of the battery on the lamp, said device comprising a supporting means including an insulating member, a fixed contact carried by the said member, a movable contact slidably mounted in the fixed contact, and spring means compressing on the movable member.

21. In a flashlight, a device for electrically connecting the central terminal of a battery with the central contact of a lamp and for resisting the thrust of the battery on the lamp, said device comprising a supporting means including an insulating member, a fixed contact carried by the said member, a movable contact slidably mounted in the fixed contact, spring means compressing on the movable member, and interengaging flanges on the fixed and movable contacts to permanently connect the same together.

22. In a flash-light having a casing, reflector, lens, lamp bulb and battery, said casing having adjacent to its forward end a shoulder and said lens being secured over the reflector by an exterior ring, in combination, a supporting member for said reflector, comprising a metal ring adapted to engage said shoulder, an insulating disk fitted within and supported by said ring, a metal plate on the lower side of said disk, a metal eyelet connecting said disk and plate and receiving the lower tubular portion of said reflector, and means for connecting the negative pole of the battery with said metal plate, one terminal of the lamp being in electrical connection with the positive pole of the battery, and said reflector at its upper edge being spaced from the surrounding metal parts of the flash-light.

23. In a flash-light having a casing, reflector, lens, lamp bulb and battery, said lens being secured over the reflector by an exterior ring, in combination, an insulating disk supported in the forward end of the casing, a metal plate on the lower part of said disk, a metal eyelet connecting said disk and plate and receiving the lower tubular portion of said reflector, means for connecting the negative pole of the battery with said metal plate, and a vertically yieldable contact carried by said disk and engaging one terminal of the lamp and being in electrical connection with the positive pole of the battery, said reflector being supported by said disk and plate and at its upper edge spaced from the surrounding metal parts of the flash-light.

24. In a flash-light having a casing, reflector, lens, lamp bulb and battery, said lens being secured over the reflector by an exterior ring, in combination, a supporting member for said reflector supported in the forward end of the casing, comprising a metal ring, an insulating disk fitted within and supported by said ring, a metal plate on the lower side of said disk, a metal eyelet connecting said disk and plate and receiving the lower tubular portion of said reflector, and means for connecting the negative pole of the battery with said metal plate, one terminal of the lamp being in electrical connection with the positive pole of the battery, and said reflector at its upper edge being spaced from the surrounding metal parts of the flash-light.

25. In a flash-light having a casing, reflector, lens, lamp bulb and battery, said lens being secured over the reflector and said reflector having a depending tubular portion receiving the lamp, in combination, a supporting member for said reflector supported adjacent the forward end of the casing, comprising a metal ring, an insulating disk fitted within and supported by said ring, a metal disk at the lower face of said insulating disk and at its edges spaced from the conductive surfaces of the flash-light, and means for connecting the negative pole of the battery with said metal disk, one terminal of the lamp being in electrical connection with the positive pole of the battery and said reflector at its upper edge being spaced from the surrounding metal parts of the flash-light and at its lower tubular portion being extended through said disks and in electrical connection with said metal disk.

26. In a flash-light having a casing, reflector, lens, lamp bulb and battery, said lens being secured over the reflector and said reflector having a depending tubular portion receiving the lamp, in combination, a supporting member for said reflector supported adjacent the forward end of the casing, comprising a metal ring, an insulating disk fitted within and supported by said ring, a metal disk at the lower face of said insulating disk and at its edges spaced from the conductive surfaces of the flash-light, and means for connecting the negative pole of the battery with said metal disk, one terminal of the lamp being in electrical connection with the positive pole of the battery and said reflector at its upper edge being spaced from the surrounding metal parts of the flash-light and at its lower tubular portion being extended through said disks and flanged outwardly and being in electrical connection with said metal disk.

27. In a flash-light having a metal casing, reflector, lens, lamp bulb and battery, said lens being secured over the reflector and said reflector at its upper edge being spaced from the surrounding metal parts of the flash-light and at its lower portion having a depending tubular member receiving the lamp, in combination, a support for said reflector adjacent the forward end of the casing, comprising a metal ring, an insulating disk fitted within said ring, a metal disk at the lower face of said insulating disk and at its edges spaced from the conductive surfaces of the flash-light, means connecting the negative pole of the battery with said casing, an external slide on said casing, and an interior conductive strip connected with said slide and having a forward end adapted to engage said metal disk when moved so to do, one terminal of the lamp being in electrical connection with the positive pole of the battery, and the tubular portion of said reflector being extended through said disks and in electrical connection with said metal disk.

28. In a flashlight having a casing, a battery therein, a reflector and a lamp, a device adapted to provide an abutment between the battery and the lamp, comprising, a metallic base, a fixed contact thereon adapted for abutment by the battery, a yielding contact mounted to slide with respect to and electrically connected with said fixed contact adapted for abutment by the lamp, and an insulating element between said contacts and said base.

29. In a flashlight having a casing, a battery therein, a reflector and a lamp, a device adapted to provide an abutment between the battery and the lamp, comprising, a tubular base, a contact fixed in but insulated from one end of said base and adapted for abutment by the battery, and a contact yieldingly mounted in said base and connected with said fixed contact and adapted for abutment by the lamp.

30. In a flashlight having a casing, a battery therein, a reflector and a lamp, a device adapted to provide an abutment between the battery and the lamp, comprising, a base arranged to fit the casing and adapted to receive the reflector and lamp in order to center the same, a tubular extension on said base, a contact fixed in but insulated from one end of said extension and adapted for abutment by the battery, and a contact yieldingly mounted in said extension and connected with said fixed contact and adapted for abutment by the lamp.

31. In a flashlight having a casing, a battery therein, a reflector and a lamp, a device adapted to provide an abutment between the battery and the lamp, comprising, a disc adapted to fit the casing, a contacting member on said disc adapted for contact by the lamp terminal and for abutment by the battery terminal in order to absorb the battery thrust and conduct the current therefrom to the lamp, and a socket on said disc adapted to position the lamp to engage said contacting member and insulated therefrom.

32. In a flashlight having a casing, a battery therein, a reflector and a lamp, a device adapted to provide an abutment between the battery and the lamp, comprising, a disc adapted to fit the casing, a contacting member on said disc adapted for contact by the lamp terminal and for abutment by the battery terminal in order to absorb the battery thrust and conduct the current therefrom to the lamp, a socket on said disc adapted to position the lamp to engage said contacting member and insulated therefrom, and a contact on said disc and connected with said socket.

33. In a flashlight having a casing, a battery therein, a reflector and a lamp, a device adapted to provide an abutment between the battery and the lamp, comprising, a disc of insulating material adapted to fit the casing, a central contacting member on said disc adapted for contact by the central lamp terminal and for abutment by the battery terminal in order to absorb the battery thrust and conduct the current therefrom to the lamp, a socket on said disc adapted to position the lamp to engage said contacting member and insulated therefrom, and a contact ring on said disc and connected with said socket.

34. In a flashlight having a casing, a battery therein, a reflector and a lamp, a device adapted to provide an abutment between the battery and the lamp, comprising, a disc adapted to fit the casing, a contacting member on said disc having a yielding part adapted for contact by the lamp terminal and having a part adapted for abutment by the battery terminal in order to absorb the battery thrust and conduct the current therefrom to the lamp, and a socket on said disc adapted to position the lamp to engage said contacting member and insulated therefrom.

Signed at New York, New York, this 15th day of April, 1920.

JOHN T. DRUFVA.